March 13, 1951     W. L. SCHLEGEL, JR     2,545,213
BRAKEHEAD ARRANGEMENT
Filed July 5, 1945     2 Sheets-Sheet 1
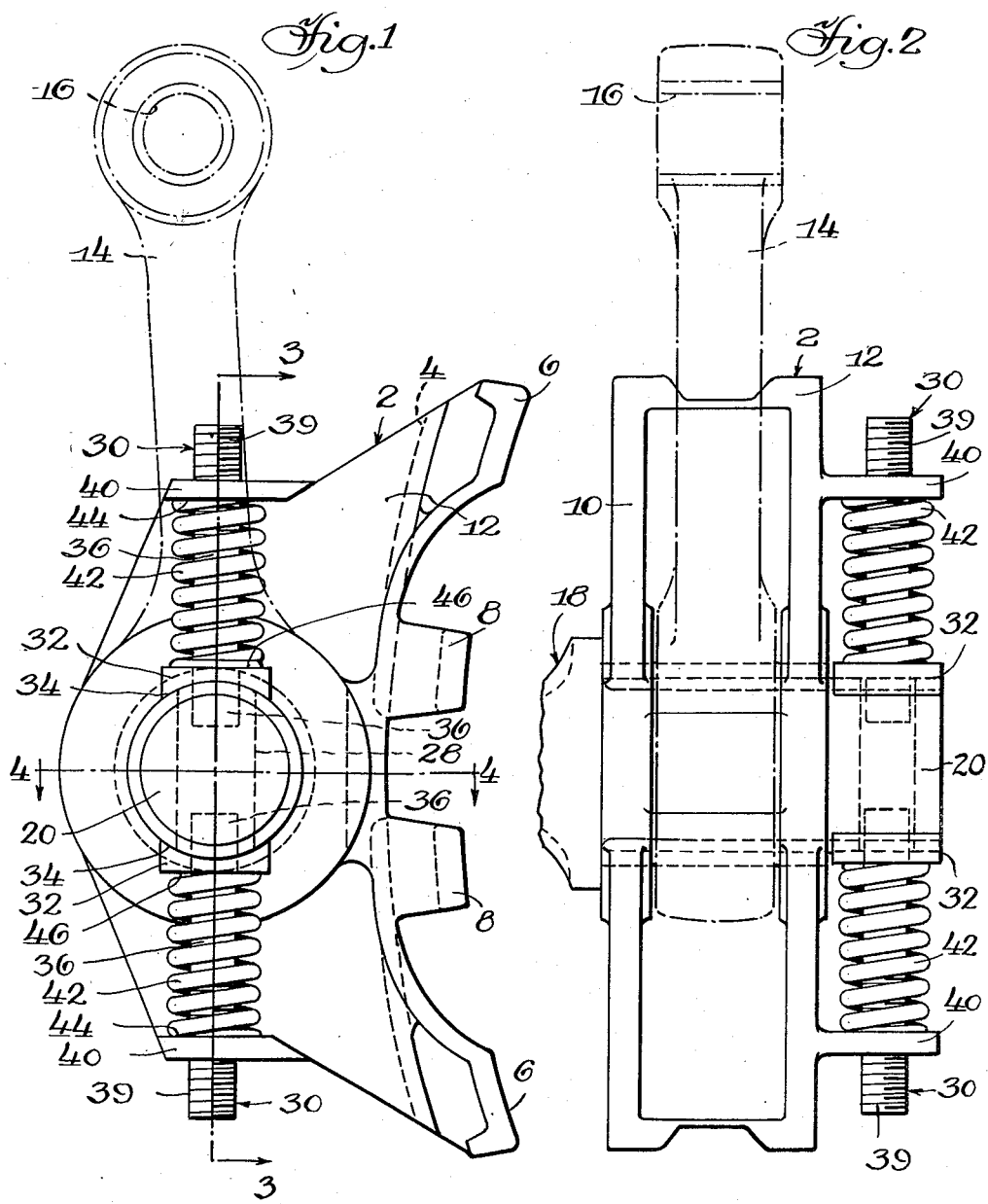
INVENTOR.
Walter L. Schlegel, Jr.
BY
Atty.

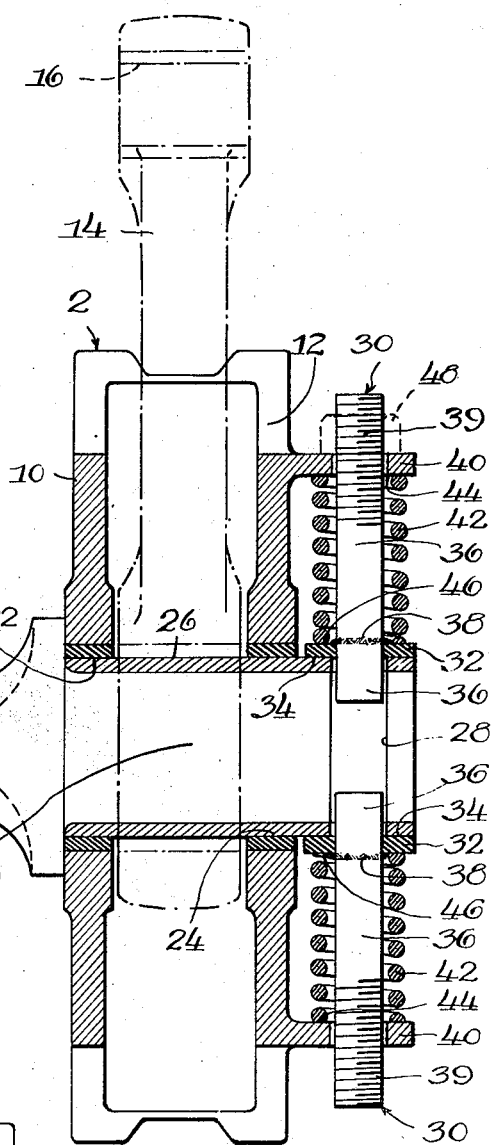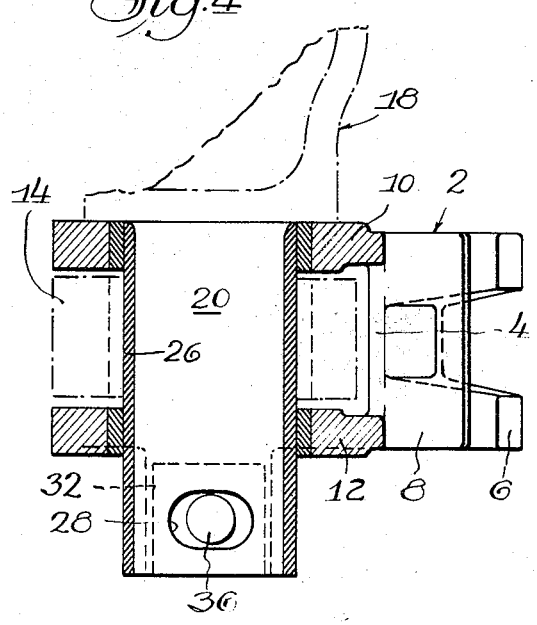

Patented Mar. 13, 1951

2,545,213

UNITED STATES PATENT OFFICE 2,545,213

BRAKEHEAD ARRANGEMENT

Walter L. Schlegel, Jr., Chicago, Ill., assignor to American Steel Foundries, Chicago, Ill., a corporation of New Jersey Application July 5, 1945, Serial No. 603,368

19 Claims. (Cl. 188—221.1)

My invention relates to railway brake equipment and more particularly to a device for yieldingly maintaining a brake head in a desired position on an associated supporting member.

The general object of my invention is to design a device such as above described in which friction means carried by the brake head are actuated into engagement with the cylindrical perimeter of a brake beam trunnion, connecting the head to an associated hanger, by springs compressed between the brake head and the friction means.

Another object of my invention is to design a brake head balancing device wherein the device is maintained in assembled relationship without the use of a threaded member, such as a nut, commonly utilized to achieve the desired spring pressure in order to obtain the necessary friction.

A further object of my invention is to provide novel means associated with the brake head and cooperating with the brake beam restricting relative pivotal movement between the brake head and hanger within limits permitting the brake head to adjust itself to the periphery of an associated rotatable member to be braked.

Still another object of my invention is to interlock the before-mentioned friction means with the brake head in such manner as to eliminate bending stresses on the springs as the head rotates on the brake beam.

In the drawings:

Figure 1 is a side elevation of the preferred embodiment of my invention;

Figure 2 is a rear elevation, taken from the left, as seen in Figure 1;

Figure 3 is a sectional view taken substantially in the vertical plane indicated by the line 3—3 of Figure 1; and Figure 4 is a sectional view taken substantially in the horizontal plane indicated by the line 4—4 of Figure 1.

Describing my invention in detail, the brake head, generally designated 2, comprises a front wall 4 formed with spaced end lugs 6, 6, and spaced intermediate lugs 8, 8, all of said lugs being formed and arranged for connection in a conventional manner to an associated brake shoe. The front wall 4 is formed with the inboard and outboard side walls 10 and 12, receiving therebetween a brake hanger 14 having at its upper end a bushed opening 16 for pivotal connection to an associated supporting truck member.

A brake beam, generally designated 18, is provided for pivotally interconnecting the brake head and hanger, and for this purpose, comprises a bushed trunnion end 20 extending through bushed openings 22 and 24 in the inboard and outboard walls 10 and 12 of the head 2 and through an aligned bushed opening 26 in the hanger, thereby affording a pivotal connection between the brake head and hanger. The trunnion 20 is formed at its outer end with an elongated diametrically arranged opening or slot 28 extending therethrough for a purpose hereinafter described.

The brake head balancing device comprises friction means for yieldingly resisting rotation of the brake head on the trunnion 20 of the brake beam comprising the boltlike members generally designated 30, 30 each having a friction shoe or block 32 in frictional engagement as at 34 with the cylindrical perimeter of the bushed trunnion 20, each of said shoes 32, 32 having an opening therein for the reception of the shank 36 of the associated member 30 and being fixed thereto adjacent the end thereof by welding as at 38 to thereby form an integral portion of the member 30, the end 36 of each member 30 extending within the opening 28 in the trunnion 20 of the brake beam and the opposite threaded end 39 of each member 30 extending through an opening in one of the associated spring seat lugs 40, 40 integrally formed with the outboard wall 12 of the brake head 2. Sleeved over the shank 36 of each member 30 is a coil spring 42 having one end thereof in engagement as at 44 with one of the spring seat lugs 40, 40 on the outboard wall 12 of the brake head 2 and having engagement at the other end thereof as at 46 with the friction shoe 32 of the associated member 30, said springs 42, 42 being under compression between the respective lugs 40, 40 of the brake head and the friction shoes 32, 32 and thereby urging the shoes into frictional engagement with opposite sides of the trunnion 20 of the brake beam 18 and the ends 36, 36 of the members into the transverse opening 28 in the brake beam trunnion 20.

It will be apparent that by this arrangement the brake head is yieldably and adjustably mounted upon the brake beam trunnion. As the springs 40, 40 actuate the friction shoes 30, 30 with substantially equal pressure into frictional engagement with opposite sides of the trunnion end of the brake beam, the brake head will be maintained in an upright vertical position on the brake beam in the event of wear occurring on the engaged surfaces of the brake head and the brake beam trunnion whereby the brake shoe, carried by the brake head, will be engaged with the periphery of the wheel, or other member to be braked, along complementary braking surfaces.

The brake head is locked on the brake beam against lateral displacement by the disposition of the ends 36, 36 of the members 30, 30 within the elongated opening 28 of the brake beam. Rotation of the brake head on the beam trunnion 20 is also restricted within limits permitting the brake head to adjust itself to the periphery of the associated wheel by this arrangement by abutment of the ends 36, 36 of the members 30, 30 with the margins of the elongated opening 28 in the brake beam trunnion, and it may be noted that, in the event that one or both of the springs 40, 40 breaks in service, this arrangement will prevent excessive rotation of the brake head about the trunnion 20 to a point at which it might be knocked off the beam and thereby create the danger of derailment.

It may be noted that the interlock between the lugs 40, 40 and the respective members 30, 30 prevents bending stresses on the springs 42, 42 as the head is rotated on the beam against the frictional resistance caused by the engagement of the beam and the shoes 32, 32. Furthermore, as above noted, the head 2 is prevented from "walking off" the end of the beam by engagement of the members 30, 30 with the outboard margin of the slot 28.

In the assembly of the brake arrangement described, each of the boltlike members 30, 30 may have nuts, one of which is shown at 48, threaded on the ends 38, 38 thereof to compress the springs 42, 42 sufficiently between the lugs 40, 40 on the brake head and the friction shoes of the members 30, 30, to permit the insertion of the trunnion end between the members 30, 30. The brake head and brake hanger are then positioned with their openings in alignment for receiving the trunnion of the brake beam and thereafter the nuts 48 may be backed off the boltlike members 30, 30 to position the ends 36, 36 of the latter within the opening 28 in the brake beam trunnion and the friction shoes 32, 32 in engagement with the cylindrical perimeter of the brake beam trunnion.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, a brake head having spaced inboard and outboard walls, a support member therebetween, a cylindrical pivot member extending through complementary aligned openings in said walls and said support member, spring seat lugs on said outboard wall at opposite sides of said pivot member, a pair of boltlike members extending through respective lugs and into an elongate transverse opening in said pivot member and each comprising an integral friction block between the ends thereof in complementary engagement with the cylindrical perimeter of said pivot member, and a coil spring sleeved over each boltlike member and compressed between the associated friction block and lug.

2. In a brake head balancing device, a brake head member having spaced inboard and outboard walls, a support member therebetween, a brake beam with a cylindrical trunnion extending through said members and affording a pivotal connection therebetween, spring seat lugs on said outboard wall, a boltlike member extending through each lug and into an elongate transverse opening in said trunnion and comprising an integral friction block in complementary engagement with the cylindrical perimeter of said trunnion, and resilient means sleeved over each of said boltlike members and compressed between the associated friction block and lug.

3. In a brake head balancing device, a brake head member having spaced inboard and outboard walls, a support member therebetween, a brake beam with a cylindrical trunnion extending through said members and affording a pivotal connection therebetween, a pair of boltlike members at opposite sides of said trunnion each extending into an elongate transverse opening in said trunnion, lugs integral with said outboard wall sleeved over said boltlike members, friction blocks integral with said boltlike members and in complementary engagement with said trunnion, and resilient means compressed between said lugs and said blocks.

4. In a brake head balancing device, a brake head comprising spaced inboard and outboard walls, a hanger extending between said walls, and a beam with a cylindrical trunnion extending through aligned openings in said walls and hanger, a boltlike member extending into an elongate transverse opening in said trunnion, a lug integral with said outboard wall sleeved over said boltlike member, said member comprising a friction block integral therewith in complementary engagement with the cylindrical perimeter of said trunnion, and resilient means sleeved over said member and compressed between said friction block and said lug.

5. In a brake head balancing device, a brake head, a support therefor, a brake beam having a cylindrical trunnion extending through and pivotally interconnecting the same, spring abutment means on said head at the outboard side thereof, friction means in complementary engagement with said trunnion, elongate members extending through respective abutments means and friction means and into a transversely extending opening in said trunnion, each member being fixed to the associated friction means, and resilient means sleeved over each member and compressed between the associated friction means and abutment means.

6. In a brake head balancing device, a brake head, a support therefor, a brake beam having a cylindrical trunnion extending through said head and support and pivotally interconnecting the same, spaced lugs on said head at the outboard side thereof, a pair of boltlike members extending through said lugs and into an elongate transverse opening in said trunnion, friction means integral with said members and in complementary engagement with opposite sides of said trunnion, and resilient means compressed between each lug and the associated friction means.

7. In a brake head balancing device, a brake head, a support therefor, a beam having a cylindrical trunnion extending through and pivotally interconnecting said brake head and support, spring abutment means on said head at the outboard side thereof, elongate members extending through respective abutment means and into an elongate transverse opening in said trunnion, friction means integral with said members and in complementary engagement with said trunnion, and resilient means compressed between and reacting against each of said abutment means and the adjacent friction means.

8. In a brake head balancing device, a brake head, a support therefor, a cylindrical pivot member extending through and pivotally interconnecting said head and support, friction means in complementary engagement with the cylindrical perimeter of said pivot member, spring abutment means on said head, an elongate member fixed to said friction means and extending radially outward of said pivot member through said spring abutment means and radially inward into an elongate transverse opening in said pivot member, and resilient means compressed between said friction means and said abutment means.

9. In a brake head balancing device, a brake head, a cylindrical pivot member extending through said head, friction members at opposite sides of said pivot member in complementary engagement with the cylindrical perimeter of said pivot member, spring seat means on said head, and resilient means compressed between respective spring seat means and said friction members, each of said friction members having means integral therewith extending into an elongate transverse opening in said pivot member and through the associated resilient means and spring seat means.

10. In a brake head balancing device, a brake head, a cylindrical pivot member extending through said head, friction members in complementary engagement with the cylindrical perimeter of said pivot member outboard of said head, spring seat means on said head, resilient means compressed between said spring seat means and said friction members, and means integral with each of said friction members extending through the associated resilient means and spring seat means and directly engageable with said pivot member for preventing lateral movement, and limiting rotation, of said head on said pivot member, said means and friction members being movable in accordance with said head.

11. In a brake head balancing device, a brake head, a cylindrical pivot member extending through said head, a friction member in complementary engagement with the cylindrical perimeter of said pivot member outboard of said head, spring seat means on said head, resilient means compressed between said friction member and said spring seat means, and means integral with said friction member extending through said resilient means and spring seat means and directly engageable with said pivot member for preventing lateral movement, and limiting rotation, of said head on said pivot member, said means and friction members being movable in accordance with said head.

12. In a brake assembly, a brake head, a hanger, a brake beam having a cylindrical trunnion extending through said head and hanger and pivotally interconnecting the same, spring seat means on said head, friction means on opposite sides of said trunnion, each of said friction means comprising a friction member in complementary direct engagement with the cylindrical perimeter of said trunnion outboard of said head and having a portion thereof extending through an adjacent spring seat means, and resilient means compressed between each spring seat means and friction member, said friction means being movable in accordance with said head.

13. In a brake assembly, a pivot element, a brake head pivotally mounted on said element, spring seat means on said head, friction members in complementary engagement with a cylindrical perimeter of said pivot element outboard of said head and each having a portion extending through said spring seat means, and resilient means sleeved over said portion and compressed between said member and said spring seat means, each of said members having means integral therewith cooperatively and directly interlocked with said pivot element outboard of said head for preventing lateral movement, and limiting rotation, of said head on said pivot element.

14. In a brake head assembly, a pivot member, a brake head member pivotally mounted thereon, and friction means for controlling relative pivotal movement between said members comprising a pair of friction devices disposed outboardly of said head member, each of said devices comprising a friction shoe engaging the pivot member, means carried by the shoe and engaged with said pivot member for limiting outboard movement of the brake head member with respect to said pivot member, means connecting the shoe to the brake head member for movement therewith as the latter pivots with respect to said pivot member, and spring means reacting against the shoe and brake head member for urging the shoe into frictional engagement with the pivot member, the shoes of respective devices engaging the pivot member at substantially diametrically opposed points about its perimeter to balance the reaction of the spring means of respective devices and thereby prevent tilting of the brake head member.

15. In a brake assembly, a cylindrical pivot member, a brake head pivoted thereon, spring-actuated friction means disposed at diametrically opposite sides of said pivot member and including a pair of friction members in complementary engagement with the cylindrical surface of said pivot member outboard of said head, spring seat means on said head, a pair of boltlike elements each extending through its respective spring seat means through one of said friction members and into an elongate opening in said pivot member, and a coil spring sleeved over each boltlike member and compressed between the associated friction member and spring seat means, said springs being under substantially equal compression and holding said friction members against said pivot member under substantially equal pressures and reacting under the same pressures against their respective spring seat means, whereby said head is held on said pivot member in the plane substantially at right angles to the axial line of said pivot member.

16. In a brake head balancing device, a brake head, a cylindrical pivot element extending through said head, a friction member in complementary engagement with the cylindrical perimeter of said element, spring seat means on said head, and resilient means compressed between said spring seat means and said friction member, said friction member comprising means extending through said resilient means and said spring seat means and other means extending within an elongate transverse opening in said pivot element.

17. In a brake head assembly, a pivot member, a brake head member pivotally mounted thereon, and friction means for controlling relative pivotal movement between said members comprising a pair of friction devices disposed at the outboard side of said head member, each of said devices comprising a friction shoe engaging the pivot member, an interlocking element connected to the shoe and received within an elongated opening in said pivot member for limiting outboard movement of the head with respect to the pivot member, said element being engageable with opposed margins of said opening to limit pivotal movement of the brake head member on said pivot member, means connecting the shoe to the brake head member for movement therewith as the latter pivots with respect to said pivot member, and spring means reacting between the shoe and brake head member for urging the shoe into frictional engagement with the pivot member, the shoes of respective devices being engaged with the pivot member at substantially diametrically opposed points about its perimeter.

18. In a brake head balancing device, a brake head, a cylindrical pivot member extending through said head, a plurality of independent friction means at the outboard side of said head disposed at diametrically opposite sides of said pivot member and each including a friction element in engagement with the adjacent side of the cylindrical perimeter of said pivot member, a spring seat on the head in alignment with said element radially of said pivot member, and spring means compressed between the seat and the element urging the element against said pivot member, said friction means being arranged to counterbalance each other whereby said head is caused to be maintained in a plane substantially at right angles to the axis of said pivot member.

19. A brake assembly comprising a pivot member, a brake head mounted thereon, a plurality of friction devices arranged in counterbalancing relation with respect to each other carried on the outboard side of said head, each friction device including a spring seat on the head, friction means engaging the adjacent portion of the cylindrical perimeter of the pivot member, an elongate element fixed to said friction means and extending through said spring seat, and resilient means compressed between said friction means and said seat.

WALTER L. SCHLEGEL, Jr.

REFERENCES CITED

The following references are of record in the file of this patent:

UNITED STATES PATENTS

| Number | Name | Date |
| --- | --- | --- |
| 533,559 | Robischung | Feb. 5, 1895 |
| 959,466 | Cornwall | May 31, 1910 |
| 1,604,351 | Hedgcock | Oct. 26, 1926 |